United States Patent
Dorum

(10) Patent No.: US 9,658,074 B2
(45) Date of Patent: May 23, 2017

(54) DIVERGING AND CONVERGING ROAD GEOMETRY GENERATION FROM SPARSE DATA

(71) Applicant: HERE Global B.V., Veldhoven (NL)

(72) Inventor: Ole Henry Dorum, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 205 days.

(21) Appl. No.: 14/512,588

(22) Filed: Oct. 13, 2014

(65) Prior Publication Data

US 2016/0102984 A1    Apr. 14, 2016

(51) Int. Cl.
| | |
|---|---|
| *G01C 21/26* | (2006.01) |
| *G06F 17/30* | (2006.01) |
| *G01C 21/32* | (2006.01) |
| *G08G 1/01* | (2006.01) |
| *G08G 1/0968* | (2006.01) |

(52) U.S. Cl.
CPC .......... *G01C 21/26* (2013.01); *G01C 21/32* (2013.01); *G06F 17/30312* (2013.01); *G08G 1/012* (2013.01); *G08G 1/096811* (2013.01)

(58) Field of Classification Search
CPC ... G08G 1/096888; G01C 21/32; G01C 21/26
See application file for complete search history.

(56) References Cited

U.S. PATENT DOCUMENTS

| | | | | |
|---|---|---|---|---|
| 7,565,241 B2* | 7/2009 | Tauchi | ................... | G01C 21/32 340/995.14 |
| 8,073,617 B2* | 12/2011 | Nakamura | ............. | G01C 21/32 701/446 |
| 8,359,156 B2* | 1/2013 | Guo | ........................ | G01C 21/32 701/411 |
| 8,566,021 B2* | 10/2013 | Smartt | ................... | G01C 21/32 701/409 |

(Continued)

FOREIGN PATENT DOCUMENTS

| | | |
|---|---|---|
| EP | 2427726 A1 | 3/2012 |
| TW | 201131143 A | 9/2011 |

(Continued)

OTHER PUBLICATIONS

Biagioni et al., Inferring Road Maps from GPS Traces: Survey and Comparative Evaluation, Nov. 15, 2011, 91st Annual Meeting of the Transportation Research Board.

(Continued)

*Primary Examiner* — Thomas G Black
*Assistant Examiner* — Peter D Nolan
(74) *Attorney, Agent, or Firm* — Lempia Summerfield Katz LLC

(57) ABSTRACT

Road geometries may be determined from sparse data by receiving mobile device data points comprising data indicating positions of vehicles having traveled on a roadway of a geographic area, the roadway involving a convergence or divergence of road branches for the roadway. At least one trajectory angle for a particular mobile device data point of (Continued)

the mobile device data points may be determined using at least one trajectory line connecting the particular mobile device data point to an adjacent mobile device data point, and mobile device data points may be grouped based on the trajectory angles.

20 Claims, 9 Drawing Sheets

(56) References Cited

U.S. PATENT DOCUMENTS

| | | | | |
|---|---|---|---|---|
| 8,620,532 | B2* | 12/2013 | Curtis | G06Q 30/0282 |
| | | | | 370/401 |
| 8,655,592 | B2* | 2/2014 | Ikeda | G01C 21/32 |
| | | | | 340/988 |
| 8,706,403 | B2* | 4/2014 | den Otter | G01C 21/26 |
| | | | | 701/400 |
| 8,825,386 | B2* | 9/2014 | Tsutsumi | G01C 21/3626 |
| | | | | 701/430 |
| 8,942,920 | B1* | 1/2015 | Davidson | G01C 21/32 |
| | | | | 701/446 |
| 8,949,021 | B2* | 2/2015 | Witmer | G01C 21/32 |
| | | | | 701/409 |
| 8,958,985 | B1* | 2/2015 | Davidson | G01C 21/32 |
| | | | | 701/446 |
| 8,972,103 | B2* | 3/2015 | Elwart | G01C 21/32 |
| | | | | 342/357.21 |
| 9,140,566 | B1* | 9/2015 | Curtis | G06Q 30/0282 |
| 9,212,919 | B2* | 12/2015 | Kanematsu | G01C 21/30 |
| 9,273,975 | B1* | 3/2016 | Davidson | G01C 21/32 |
| 9,322,660 | B2* | 4/2016 | Mund | G01C 21/32 |
| 2006/0155464 | A1 | 7/2006 | Smartt | |
| 2008/0120171 | A1* | 5/2008 | Ikeuchi | G01C 21/32 |
| | | | | 705/13 |
| 2008/0162041 | A1* | 7/2008 | Nakamura | G01C 21/32 |
| | | | | 701/533 |
| 2010/0131193 | A1* | 5/2010 | Shnyr | G01C 21/32 |
| | | | | 701/532 |
| 2011/0172913 | A1* | 7/2011 | Nakamura | G01C 21/32 |
| | | | | 701/532 |
| 2011/0264708 | A1 | 10/2011 | Smartt | |
| 2011/0313823 | A1* | 12/2011 | Ikeuchi | G01C 21/32 |
| | | | | 705/13 |
| 2012/0095682 | A1* | 4/2012 | Wilson | G01C 21/32 |
| | | | | 701/532 |
| 2012/0116678 | A1 | 5/2012 | Witmer | |
| 2012/0232789 | A1* | 9/2012 | Nakamura | G01C 21/32 |
| | | | | 701/430 |
| 2012/0277993 | A1* | 11/2012 | Mund | G09B 29/106 |
| | | | | 701/450 |
| 2013/0013194 | A1* | 1/2013 | Tsutsumi | G01C 21/3626 |
| | | | | 701/430 |
| 2013/0060465 | A1 | 3/2013 | Smartt | |
| 2013/0166205 | A1* | 6/2013 | Ikeda | G01C 21/32 |
| | | | | 701/533 |
| 2013/0238648 | A1* | 9/2013 | Fujiwara | G01C 21/32 |
| | | | | 707/758 |
| 2014/0067938 | A1* | 3/2014 | Boldyrev | G01S 5/0252 |
| | | | | 709/204 |
| 2014/0278055 | A1* | 9/2014 | Wang | G01C 21/32 |
| | | | | 701/409 |
| 2014/0288765 | A1* | 9/2014 | Elwart | G01C 21/00 |
| | | | | 701/32.4 |
| 2015/0025802 | A1* | 1/2015 | Kato | G01C 21/3626 |
| | | | | 701/532 |
| 2015/0142306 | A1* | 5/2015 | Kanematsu | G01C 21/30 |
| | | | | 701/461 |
| 2016/0011002 | A1* | 1/2016 | Amano | G01C 21/32 |
| | | | | 701/516 |
| 2016/0171012 | A1* | 6/2016 | Davidson | G01C 21/32 |
| | | | | 701/532 |

FOREIGN PATENT DOCUMENTS

| | | |
|---|---|---|
| WO | WO2006060518 A2 | 6/2006 |
| WO | WO2010129192 A1 | 11/2010 |

OTHER PUBLICATIONS

Lee et al., Trajectory-Based Road-Geometry and Crash-Risk Estimation with Smartphone-Assisted Sensor Networks, Mar. 23, 2014, Hansung University.

Liu et al., Road Cocognition Using Coarse-Grained Vehicular Traces, Feb. 21, 2012, Shanghai Jiao Tong University.

Schroedl et al., Mining GPS Traces for Map Refinement, Aug. 23, 2002, Daimler Chrysler Research Technology.

PCT International Search Report and Written Opinion of the International Searching Authority dated Dec. 18, 2015 for corresponding PCT/IB2015/057667.

* cited by examiner

DIVERGING AND CONVERGING ROAD GEOMETRY GENERATION FROM SPARSE DATA

FIELD

The following disclosure relates to road geometry generation and/or vehicle path determination, and more specifically to road geometry generation of converging and/or diverging roadways from a collection of mobile device data associated with vehicles that have traveled the roadways.

BACKGROUND

Roadway mapping of road systems provide information for travelers regarding the existence and availability of specific sections of roadways for travel. Manual mapping may involve a person traveling a roadway to determine the actual geometry of specific roads to generate mapped system. Further, roadways may change geometry occasionally as infrastructure updates and other roadway related projects are undertaken. Also, sending people to some global locations to generate mappings of roadways may be difficult. Therefore, accurately indicating the existence and actual geometry of roadways can require significant resources because of the sheer magnitude and number of roadways involved in global road systems as well as the logistical difficulties involved with sending people around the world to appropriately track changes and developments of road systems.

SUMMARY

In an embodiment, a method includes receiving a plurality of mobile device data points comprising data indicating positions of vehicles having traveled on a roadway of a geographic area, the roadway involving a convergence or divergence of a plurality of road branches for the roadway. The method also may include connecting subsets of the plurality of mobile device data points with trajectory lines, each of the subsets associated with a particular vehicle, and wherein the lines connect adjacent mobile device data points determined by a sequence in which the individual mobile device data points of subsets were acquired. The method may also include determining at least one trajectory angle for a particular mobile device data point of the plurality of mobile device data points using at least one trajectory line connecting the particular mobile device data point to an adjacent mobile device data point, and assigning the particular mobile device data point to a particular road branch of the plurality of road branches based on the determined at least one trajectory angle.

In an embodiment, an apparatus may involve at least one processor, and at least one memory including computer program code and operable to store a plurality of mobile device data points comprising data indicating positions of vehicles having traveled on a roadway of a geographic area, the roadway involving a convergence or divergence of a plurality of road branches for the roadway. The at least one memory and the computer program code configured to, with the at least one processor, cause the apparatus at least to connect subsets of the plurality of mobile device data points with trajectory lines, each of the subsets associated with a particular vehicle, and wherein the lines connect adjacent mobile device data points determined by a sequence in which the individual mobile device data points of subsets were acquired, determine at least one trajectory angle for a particular mobile device data point of the plurality of mobile device data points using at least one trajectory line connecting the particular mobile device data point to an adjacent mobile device data point, and assign the particular mobile device data point to a particular road branch of the plurality of road branches based on the determined at least one trajectory angle.

In an embodiment, a non-transitory computer readable medium includes instructions that when executed on a computer are operable to receive a plurality of mobile device data points comprising data indicating positions of vehicles having traveled on a roadway of a geographic area, the roadway involving a convergence or divergence of a plurality of road branches for the roadway. The instructions may also be operable to connect subsets of the plurality of mobile device data points with trajectory lines, each of the subsets associated with a particular vehicle, and wherein the lines connect adjacent mobile device data points determined by a sequence in which the individual mobile device data points of subsets were acquired. The instructions may also be operable to determine at least one trajectory angle for a particular mobile device data point of the plurality of mobile device data points using at least one trajectory line connecting the particular mobile device data point to an adjacent mobile device data point, and assign the particular mobile device data point to a particular road branch of the plurality of road branches based on at the at least one trajectory angle.

BRIEF DESCRIPTION OF THE DRAWINGS

Example embodiments of the present invention are described herein with reference to the following drawings.

DETAILED DESCRIPTION

Road geometries may be determined automatically using a collection of data from mobile devices associated with vehicles traveling roadways. The collection of data may involve a significant number of data points gathered over a period of time. Paths of the vehicles may be determined using the data points, and these paths may be used to determine specific geometries of the roadways. When these geometries and/or paths are associated with a road in a road network, an autonomous vehicle or an advanced driver assistance system ("ADAS") may use the geometries and/or vehicle paths to aid in the control and/or guidance of a vehicle.

However, determining the geometries of roadways having converging or diverging legs or branches may be difficult to determine using mobile device data unless particular mobile device data points associated with vehicles traveling the particular branches of the roadway are identified. Assigning particular mobile device data points to particular converging or diverging branches may be accomplished through an analysis of heading and trajectory information indicated by data of the mobile device data points. This assignment recognizes that heading and trajectory information of a vehicle will tend to indicate a direction of travel of the vehicle, and vehicles traveling in the same direction, such as vehicles following a particular leg of a diverging bifurcation of a roadway, may have similar heading and trajectory properties that may be derived from the heading and trajectory information. This distinction based on the assignment to road branches may help to eliminate false road curvatures that may be determined from data points of roadway convergences or divergences due to the inclusion of data points that are geographically positioned close to several branches of such a roadway interchange.

A collection of mobile device data points may be analyzed to identify data points associated with a particular vehicle as the vehicle traveled through a geographic area. These identified data points may be sequentially connected with trajectory lines using location data of the data points. Angles may be determined for particular data points based on the trajectory lines and heading data of the particular data points. Mobile device data points having similar angles may be grouped and/or associated with particular legs of a diverging or converging roadway for an interchange. Road geometries of the respective legs may be determined from the mobile device data points associated with the legs.

Figure 1:
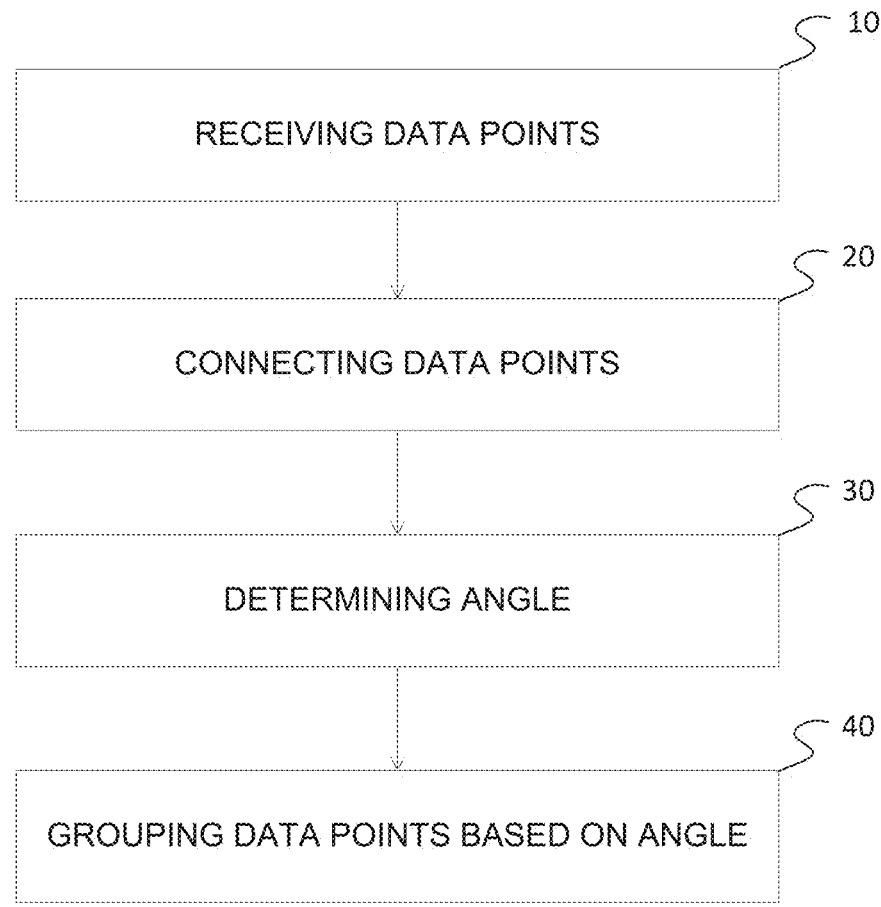
FIG. 1 illustrates a flow chart of an example embodiment for road or path geometry generation from sparse data.

FIG. 1 illustrates a flow chart of an example embodiment for road geometry generation from sparse data. As presented in the following sections, the acts may be performed using any combination of the components indicated in FIG. 4, FIG. 5, or FIG. 6. For example the term controller may refer to either controller 200 or processor 300 and the following acts may be performed by mobile device 122, server 125, a vehicle 401, or a combination thereof. Additional, different, or fewer acts may be provided. The acts are performed in the order shown or other orders. The acts may also be repeated.

In act 10, data points are received. The data points may be data points gathered by a mobile device associated with a vehicle traveling through a geographic area. The mobile device may be any device operable to provide the data points, such as the mobile device 122 as described with respect to FIGS. 4 and 5. The data points may involve any collection of data descriptive of the movement and/or location of the mobile device. For example, the data points may include or involve location data, heading data, speed data, and/or orientation data for the mobile device. The data points may also include or involve time data indicative of a time that the mobile data point was acquired, such as a time stamp or other similar data.

The data points may be identified from sparse data. Sparse data may involve a collection of many data points received from mobile devices in a geographic area over a period of time. As such, the data points may be generated by multiple mobile devices. Each of the multiple devices may be associated with different particular vehicles. Data identifying the mobile device may also be included in the data point. For example, text indicating a device identification number or code may be included in the data. From such mobile device identification data, data relating to a single device may be identified from sparse data, as well as any other collection of data from multiple mobile devices. Sparse data may be data acquired at infrequent intervals from the particular devices in the geographic area. For example, data may be collected in intervals of 10 seconds to two minutes, or even longer. As such, vehicles may travel considerable distances between data point collections.

The geographic area may contain a convergence or divergence of road branches in a roadway. For example, the geographic area may contain highway system having an off-ramp connecting a particular highway to another road. The divergence of the off-ramp may be a geographic area that involves multiple branches, such as a branch for the highway and a branch for the off-ramp.

Over time, each mobile device may have traveled through the geographic area multiple times. Each particular time a vehicle travels through the geographic area may be considered a trip. Also, each trip may involve a different associated vehicle. Particular trips for a mobile device may be determined from a collection of data points by grouping mobile data points temporally. For example, a data point from a particular trip may include time data, and this time data may be temporally proximate to other data points from a particular trip. Using a combination of mobile device identification data and temporal grouping may further allow particular trips to be identified.

In act 20, data points may be connected. The data points may be the data points received in act 10 and data points from the received data points associated with a single vehicle on a single trip may be connected. The data points may be connected using any technique, such as line or curve generation techniques based on the geographical locations indicated by the data points. For example, straight lines may be generated between temporally successive data points. Connecting temporally successive data points may be indicative of trajectories of a vehicle that traveled during a trip through the geographic area, and may be considered trajectory lines. Any technique for generating a line based on a series of data points may be used. For example, the positions for each data point may be provided and used as geometric placement data for particular positions and straight lines may be generated connecting the positions. The lines may be actual lines geometrically formed and represented, or may be a mathematical representation of lines indicating a base of measurement for other values. Further, the lines may be represented based on a geometric position or direction of the line. For example, the line may be represented as an angular component of a vector defined by a direct path between two data points. Also, the line may be represented by merely an angle relative to an established reference. For example, a direction of north may be established as a reference direction representing zero degrees and 360 degrees. In such a coordinate system, a trajectory line connecting a first data point to a second data point located directly east of the first data point may be represented by a value of 90 degrees.

In act 30, angles may be determined. The angles may be determined for particular points of the received data points and may be determined using a trajectory line as at least one base for measurement of the angle. This trajectory line may be a line generated in act 20 as a connecting line for sequential data points, and the angle may be determined for one of the sequential data points. Another trajectory line connected to the data point may be used as the other base of the angle. The angle may be determined as a reference to a coordinate direction system, such as 15 degrees from true north, or as a relative angle to any other basis for angle measurement. Also, a heading vector or direction may be determined from the mobile device data of the data point and may be used as the other base from which an angle may be determined. For example, an angle for a particular data point may be determined as an angle between the heading direction of the particular data point and a trajectory line connecting the particular data point to a sequentially subsequent data point. In another example, an angle for a particular data point may be determined as an angle between the heading direction of the particular data point and a trajectory line connecting the particular data point to a sequentially previous data point. In another example, an angle for a particular data point may be determined as an angle between a trajectory line connecting the particular data point to a sequentially previous data point and a trajectory line connecting the particular data point to a sequentially subsequent data point. Further, multiple angles may be determined for data points.

In act 40, data points may be grouped based on an angle. As such, the angles may be considered classification angles. The angle may be the angle determined in act 30. The received data points may be grouped based on a similarity of a determined angle for each of the data points. Any grouping technique may be used. For example, clustering techniques may be used.

The grouped data points may then be assigned to a branch of a converging or diverging roadway. The assigning may be accomplished based on a proximity to established branches of the roadway. In an embodiment, the location of the roadway may not be established, and the grouped data points may be used to define the branches of the roadway. In this embodiment, the data points may be assigned to a branch based on a position of a group relative to another group. Also, paths may be determined for the grouped data points, and the paths may be indicative of the branches of the roadway. Any technique for path determination from multiple data points may be used. For example, a curve may be fitted to mean component coordinate positions of the grouped data points. The curve may be representative of the road geometry of the associated branch. Further, temporal information such as a time stamp may be included or otherwise associated with data points. As such, a time vehicles associated with the data points traveled a branch, and a determination of the temporal navigability of the branch may be made. For example, if the temporal data of the data points indicates that the data points were acquired recently, the branch may be determined as a navigable option or route. Also, if the temporal data of data points does not indicate that a vehicle has traveled the assigned branch recently, such as within a previous day, month, or year, the path may be determined to not be navigable, and may not be included in navigation options for a geographic area.

In an embodiment, a fitted curve may be used as a representation of a road branch of a converging or diverging roadway upon which the mobile devices were traveling. The representation may be stored with other representations of roads in a road network represented in a geographic database 123, as is described further with respect to FIG. 4 and FIG. 6.

Figure 2:
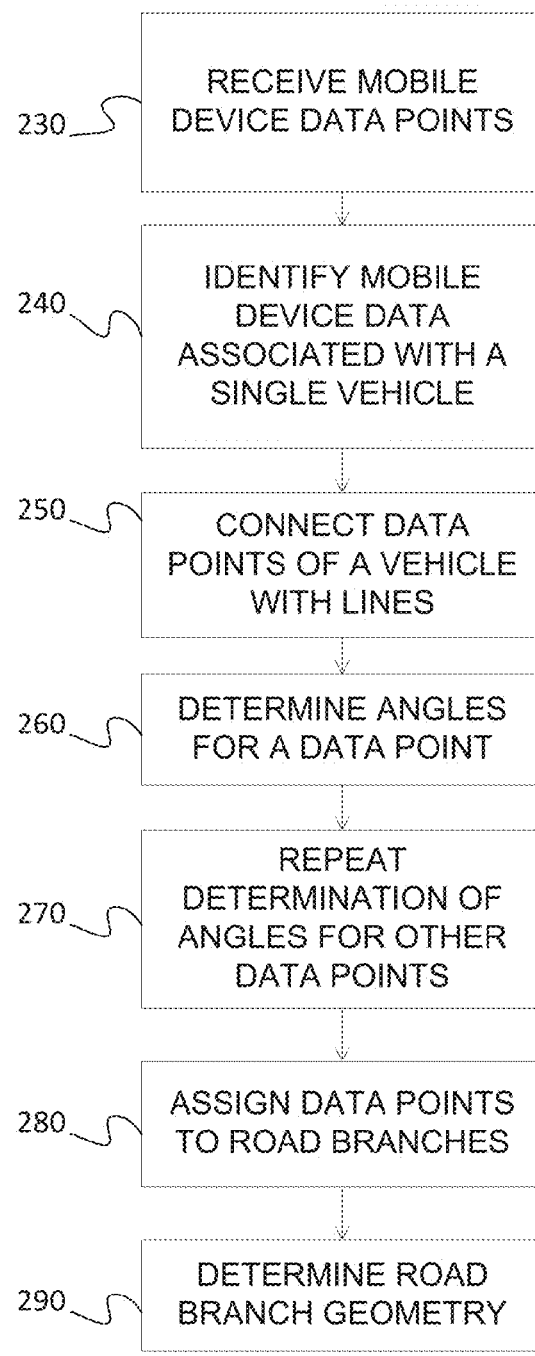
FIG. 2 illustrates a flow chart of an example embodiment for road geometry generation from sparse mobile device data acquired from a geographic area that includes converging or diverging paths.

FIG. 2 illustrates a flow chart of an example embodiment for road geometry generation from sparse mobile device data acquired from a geographic area. As presented in the following sections, the acts may be performed using any combination of the components indicated in FIG. 4, FIG. 5, or FIG. 6. For example the term controller may refer to either controller 200 or processor 300 and the following acts may be performed by mobile device 122, server 125, a vehicle 401, or a combination thereof. Additional, different, or fewer acts may be provided. For example, act 250 may be omitted. The acts are performed in the order shown or other orders. For example, act 240 may be performed before, after, or during or after act 250. The acts may also be repeated. For example, acts 250 and 260 may be repeated.

In act 230, a collection of mobile device data points is received. The collection may be received using any technique. For example, the collection may be received as a transfer of data onto a memory 301 as is described with respect to FIG. 6. The collection may involve data generated by multiple mobile devices traveling through a geographic area over a period of time. The data generated by the multiple mobile devices may be motion, location and/or elevation data representative of paths traveled through the geographic area by the mobile devices. Further, the mobile devices may be associated with vehicles and the paths traveled through the geographic area, and the data generated thereby may be representative of roadways, roads, and/or road branches used by the vehicles to travel through the geographic area.

In an embodiment, the mobile device data points may be supplemented with other data from other sources. For example, two dimensional position data may be correlated to elevation data from a terrain or elevation model that includes the position of the mobile device data point. As such, a two dimensional cartographic position for a data point may be transformed into a three dimensional position in space for the mobile device data point. A transformed three dimensional position may be used as mobile device data. In another embodiment, a mobile device may provide data points that contain three dimensional position and/or velocities headings in three-dimensional space. For example, cartographic coordinates may be determined as location information for the mobile device and coupled with elevation data provided by the mobile device.

In act 240 mobile device data points of a single mobile device may be identified from the collection of mobile data points. Also, the single mobile device may be associated with a single vehicle. Further, the identified mobile data points may be determined to be from a single trip through the geographic area for the mobile device. Mobile device data identified as being generated by a particular mobile device and/or associated with a particular trip through the geographic region may be grouped into sets of mobile device data points. The mobile device data points for a particular trip of a mobile device or associated vehicle may be grouped as a set or subset of the mobile device data points.

The mobile device data points may be identified using any technique operable to associate mobile device data points with a mobile device. For example, the mobile device data points may include data indicating a code or characters designating individual device identification. The sets may be extracted from the collection of data and stored as data separate from the collection of mobile device data, for example using the memory 301 as discussed below with respect to FIG. 6.

In act 250, the data points of a particular trip for a mobile device or vehicle may be connected with a line. The data points may be connected using any type of line or line generating technique. In an embodiment, the line involves a series of lines connecting data points. The lines may be straight lines. Further, the lines may be represented by any technique. For example, the line may be represented by an angle. An angle for a particular data point may be an angle measured from a reference of an angular coordinate system having the particular point as the origin and defined by an angle formed from the reference to a straight line connecting the particular point to another sequential point.

As the lines may be formed to connect sequential data points, the lines may be indicative of a trajectory of a vehicle associated with the data point. As such, the lines may be considered trajectory lines. For example, the lines may connect adjacent mobile device data points determined by a sequence in which the individual mobile device data points of subsets were acquired Further, the collection of data may be filtered to remove data points that are not useful for subsequent analysis or to remove data points that are not indicative of vehicles traveling roads. Such data points may be considered invalid data points. Any technique may be used to filter the collection of data. For example, specific criteria may indicate that data points of the collection are not indicative of vehicles traveling roads. In an embodiment, speeds of data points may be used to filter data points. For example, data points indicating a speed of a mobile device below an established minimum speed threshold, such as one kilometer per hour, may be filtered. In an embodiment, data points have a speed at or near zero kilometers per hour may be filtered. Other criteria may be used to filter data points as well. For example, a distance and time between successive points may indicate that an excessive or unreasonable speed may be required to travel between the two points. Also for example, a time difference between two temporally successive data points that belong to a particular mobile device may be determined and compared to a maximum time difference threshold, such as five minutes. A time difference that is too large increases the probability that a mobile device has traveled a significant distance, traveled a complex route, or did not have an intermediate data point in the collection of data. Such data points are less useful for subsequent processing.

In act 260, angles for data points may be determined. The angles may be determined as any angle indicative of a direction of travel of the mobile device. The indicated direction of travel may be an immediate or local direction, such as indicated by an angle closely approximating the heading information of the data point, or the indicated direction may be a future navigation path of the mobile device, such as a selected branch of an interchange. Further, the angles may also be indicative of the approximate shape of the road being traveled. The angles may be determined as a trajectory angle for a particular mobile device data point of the mobile device data points using at least one trajectory line connecting the particular mobile device data point to an adjacent mobile device data point.

In an embodiment, mobile device data points may include data indicating a heading direction of an associated vehicle or mobile device, and a trajectory angle is determined as an angle between the heading direction and a trajectory line. The trajectory line used as the base for the trajectory angle determination may be a trajectory angle determined as the angle between a trajectory line formed between the particular mobile device data point and a subsequent mobile device data point. The trajectory line used as the base for the trajectory angle determination may also be a trajectory angle determined as the angle between a trajectory line formed between the particular mobile device data point and a subsequent mobile device data point. Further, a trajectory angle may be determined as the angle between a trajectory line formed between the particular mobile device data point and a subsequent mobile device data point of a subset of mobile device data points and a trajectory line formed between the particular mobile device data point and a previous mobile device data point of the subset of the mobile device data points. In another embodiment, a trajectory angle may be determined with respect to a reference direction, such as true north.

In act 270, the determination of angles may be repeated for the received mobile device data points such that each of the mobile device data points has an angle determined.

Further, each of the data points may have angles determined using the same technique. For example, each data point may determine an angle between a heading of a data point and a trajectory line formed to a subsequent data point.

In act 280, data points may be assigned to road branches. The data points may be assigned based on a grouping of data points. The grouping may indicate data points of mobile devices or vehicles that have traveled on particular road branches of a road system. For example, a group of data points having similar trajectory angles may be designated as, or otherwise assigned to, a particular branch of a roadway involving a convergence or divergence of road branches. Thus, the data points may be grouped using the angles determined for the data points. In an embodiment, the data points may be clustered based on the determined angles. Any clustering technique may be used. For example, k-means clustering or k-medoid techniques may be used. Further, multiple angles may be determined for the data points and grouping may be accomplished based on a clustering of any of the multiple angles. Also, combinations of angles may be used for clustering. Further, a histogram may be constructed using the data points based on the determined angles. Such a histogram may be used to determine value ranges for cluster determination. For example, peaks may be detected in a histogram that includes numerous data points, and clustering values may be determined as the boundaries of the peaks.

In act 290, a geometry of a particular road branch may be determined based on the mobile device data points assigned to the particular road branch. Any technique operable to determine a road geometry from data points providing data representative of vehicles or mobile devices traveling along a road may be used. For example, kernel density techniques, trace merge, or other techniques may be used.

A resulting road geometry may be associated with a road in the geographic area. The geometry may be associated with the road using any technique. For example, the geometry may be used or associated in a geographic database, such as the geographic database 123 described below with respect to FIG. 6, to define a shape and/or route of the road through the geographic area.

Figure 3A:
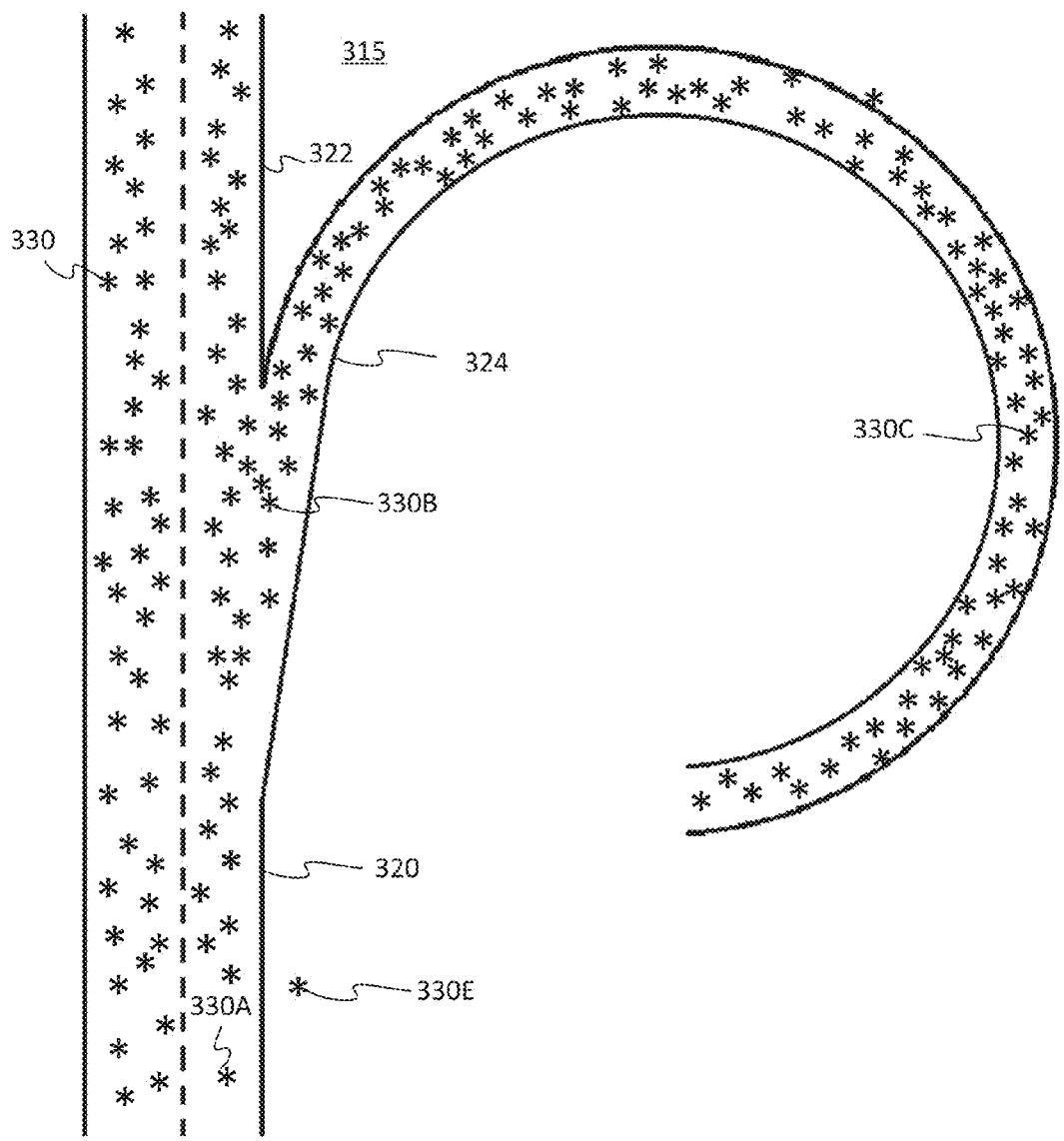
FIGS. 3A-F illustrate distinguishing mobile device data points based on path data.

FIGS. 3A-F illustrate the generation of road geometry from sparse mobile device. FIG. 3A illustrates a collection of multiple data points 330 generated by mobile devices in a geographic area 315. Most of the data points 330 are generated by mobile devices while traveling a road 320 in the geographic area, and thus consecutive data points generated by particular mobile devices may be indicative of a road through the geographic area 315. The road 320 may include multiple branches 322 and 324. One branch may be a straight branch 322 that is a continuation of a highway, and another branch 324 may be an off-ramp of the highway.

Also, some of the data points may not be indicative of the road through the geographic area 315. For example, a data point 330E may be located beyond a maximum distance from other data points, or may have a velocity below a minimum velocity to be considered indicative of the road. Data points considered not indicative of the road may be filtered out of a collection of data points prior to processing the data points to determine road geometry.

The data points 330 include data points 330A, 330B, and 330C corresponding to a specific mobile device which in turn may be associated with a specific vehicle that travels along the off-ramp branch 324. The data points 330B of the specific mobile device may be extracted from the other data points as a set of data points as shown in FIG. 3B.

Figure 3C:
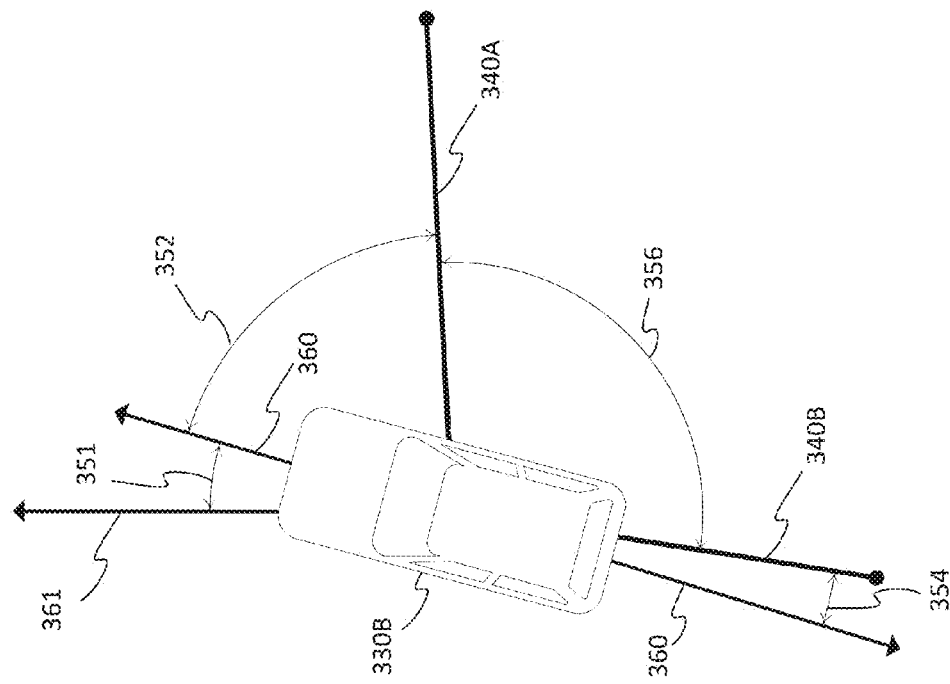
Figure 3B:
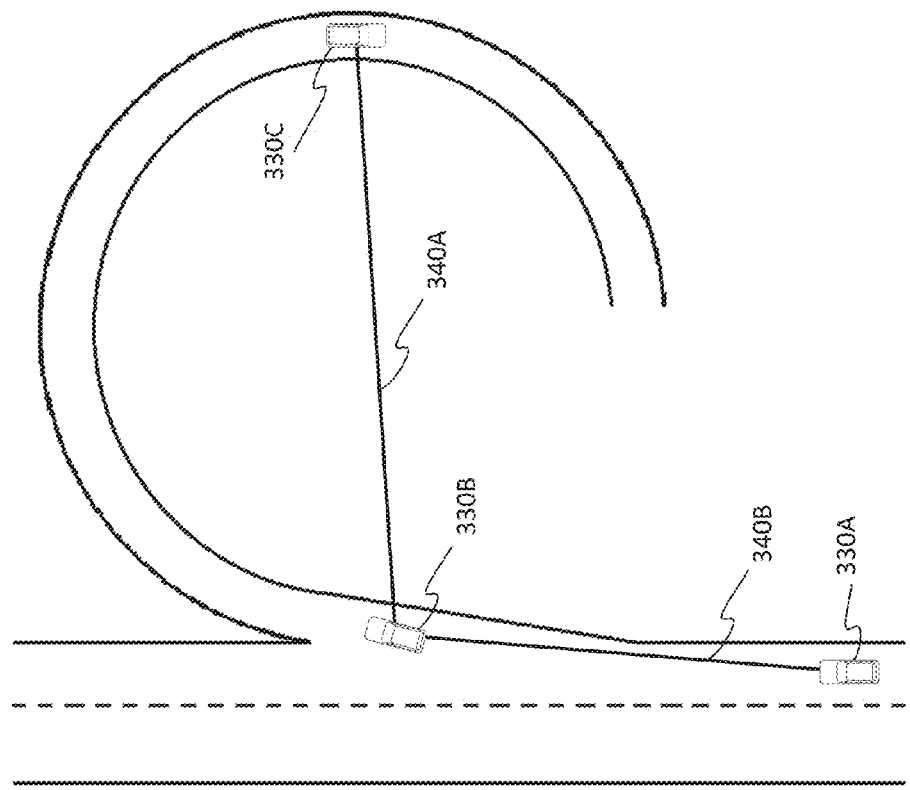

FIG. 3B illustrates the positions of a group of three consecutive data points 330A, 330B, 330C associated with a vehicle that traveled the off-ramp branch 324. A data point 330B of the group of data points that is closest to the divergence of the off-ramp branch 324 from the straight road branch 322 may be connected to a subsequent data point 330C with a trajectory line 340A. This trajectory line 340A may be considered a next trajectory edge. The data point 330B may also be connected to a previous data point 330A with a trajectory line 340B. This trajectory line 340B may be considered a previous trajectory edge.

FIG. 3C illustrates angles that may be determined based on the trajectory lines 340A, 340B connected to the data point 330B. Further, a heading vector or direction 360 may be determined based on heading data of the data point that is indicative of a direction the associated vehicle was traveling when the data point 330B was captured. This heading direction may be represented as an angle 351 measured from a reference direction 361 to the heading direction 360. For example, if the reference direction is presented at zero degrees in a coordinate system, the heading angle 351 may be 10 degrees from the reference direction. Therefore, a heading may be represented as, or defined by, a direction designated as 10 degrees from the reference. The reference may be any reference in a coordinate system. For example, the reference may be a true north direction of the geographic area 315.

Trajectory angles 352, 354, 356 may be determined for the data point 330B using the trajectory lines 340A, 340B, the heading 360, or any combination of these. For example, a next trajectory edge heading angle 352 may be determined as an angle between the heading 360 and the next edge trajectory line 340A. Also, a trajectory angle may be determined as a previous trajectory edge heading angle 354 between the previous edge trajectory line 340B and the heading 360. Further, a trajectory vertex angle 356 may be determined between the next edge trajectory line 340A and the previous edge trajectory line 340B. Any combination of the trajectory angles 352, 354, 356 may be determined. For example, all of the trajectory angles 352, 354, 356 may be determined. Also, only a single trajectory angle of the trajectory angles 352, 354, 356 may be determined.

Figure 3D:
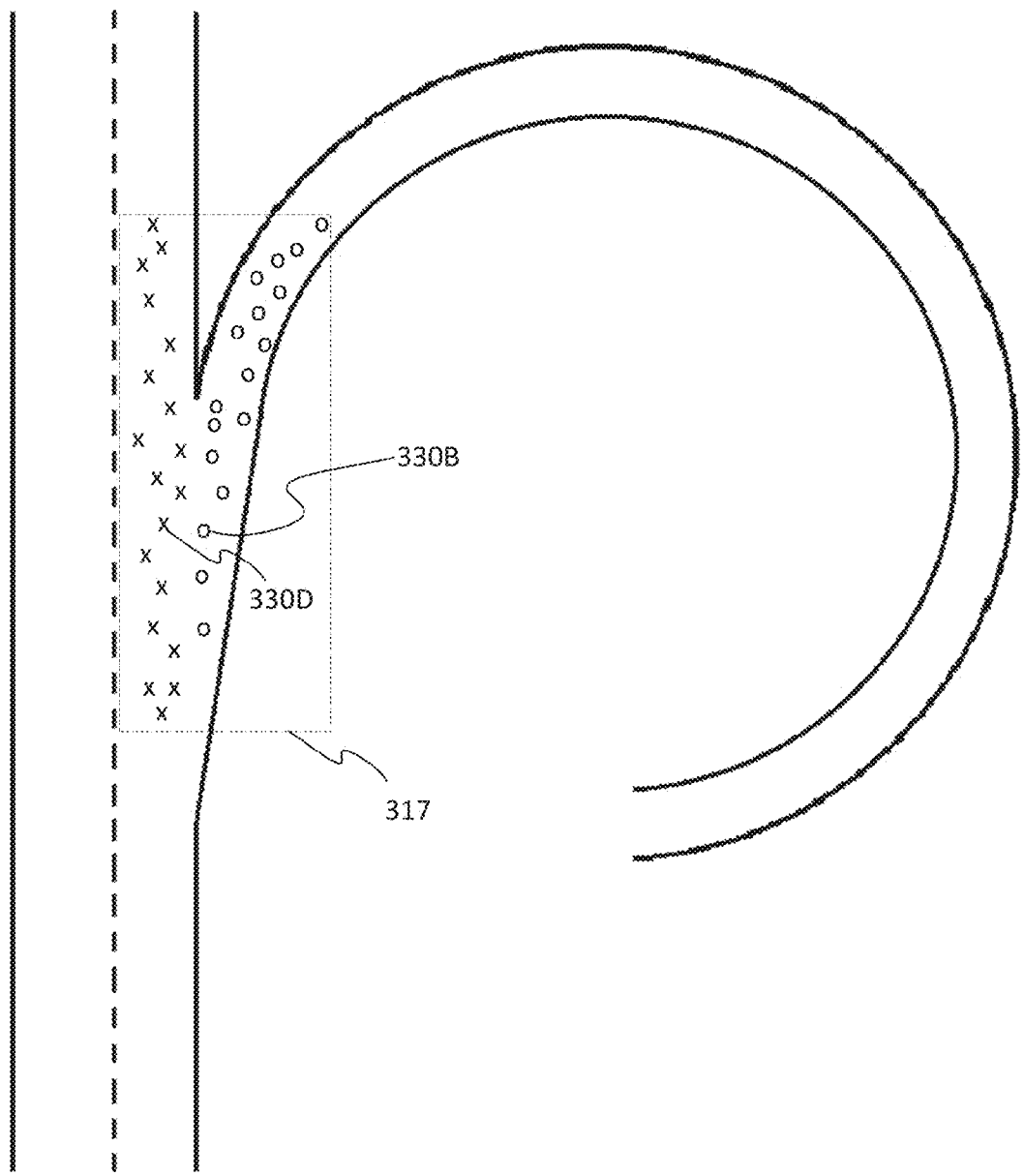

The determination of trajectory angles may be repeated for the rest of the data points 330. After determination of at least one trajectory angle for a selection of the data points 330, the data points 330 may be grouped based on the trajectory angle, as is shown in FIG. 3D. For example, data points 330 in a sub-area 317 around a road divergence may have trajectory angles determined, and data points 330 having similar angles may be grouped. The data points 330 may each have a trajectory angle determined using a same technique. For example, the data points may each have a next trajectory edge heading angle 352 determined, and the data points 330 may be grouped based on similarities of the next trajectory edge heading angle 352. For example, a group of data points may have a similar next trajectory edge heading angle 352 as the data point 330B associated with the vehicle that traveled the off-ramp branch 324 of the road. Similar may be considered within a certain value of other values for the trajectory angle. In an embodiment, the data points 330 are grouped using a clustering technique based on the next trajectory edge heading angle 352. Clustering techniques may also be based on the other trajectory angles 354, 356, as well as combinations of the angles, to determine groups of data points.

The grouping of data points 330 may allow data points associated with vehicles 330D that traveled the straight branch of the road 322, from vehicles 330B that traveled the off-ramp branch of the road 324.

Figure 3F:
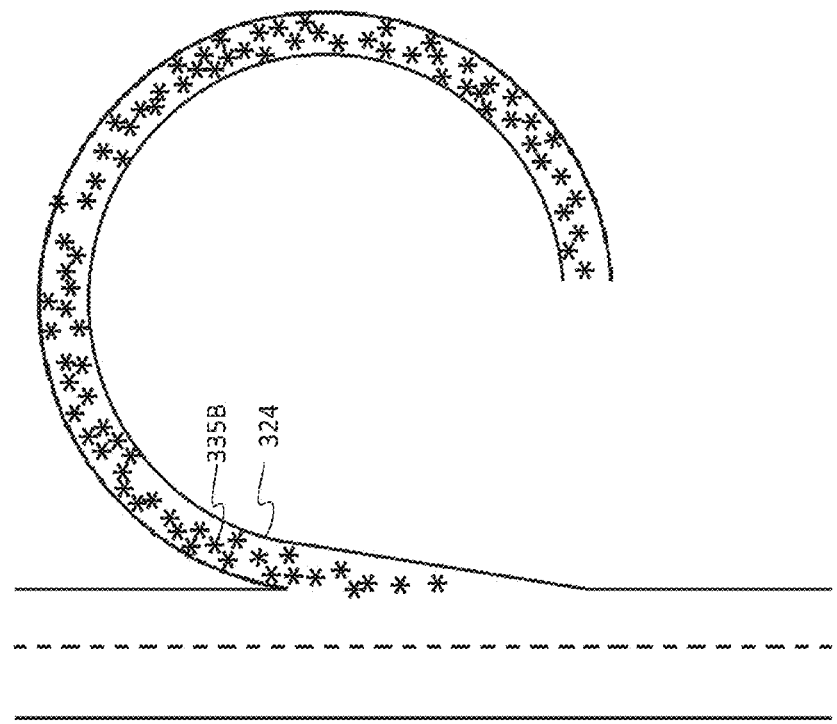
Figure 3E:
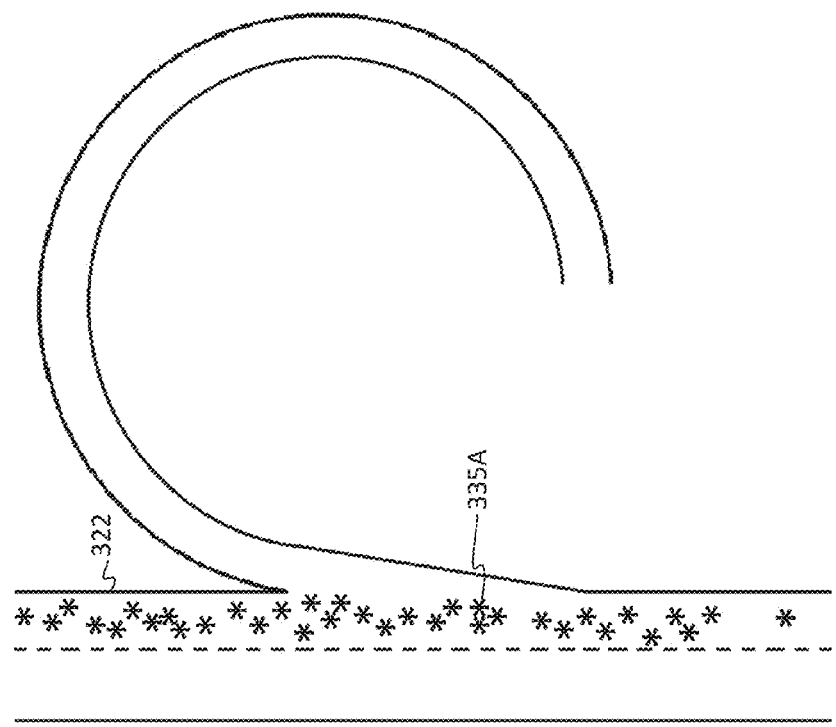

FIGS. 3E and 3F show the data points 330 distinguished based on trajectory angles. Specifically, FIG. 3E shows the grouping of data points 335 that have trajectory angles that are similar and indicate that the associated vehicles traveled the straight road branch 322. This data point group 335A is assigned to the straight road branch 322. FIG. 3F shows the grouping of data points 335B that have trajectory angles that indicate that the associated vehicles traveled the off-ramp road branch 324. This data point group 335B is assigned to the off-ramp road branch 324.

Grouping on different angles may be more effective at differentiating different types of roadway intersections. For example, the previous trajectory edge angle 354 may effective for distinguishing road branches that merge. A next trajectory edge heading angle 352 may be effective for distinguishing road branches that diverge. A trajectory vertex angle may be effective for distinguishing road branch shapes.

Once distinguished, the data point groups may be used to determine road geometry of the road branch traveled by the vehicles associated with the data points of the group. The geometry of the road branch may be stored with other road geometries in a navigational database. Such a navigational database may be used by an autonomous vehicle to navigate a road system. An autonomous vehicle is self-driving and may be referred to as a robot vehicle or an automated vehicle. The autonomous vehicle may include passengers but no driver is necessary. The mobile device 122 or another computer system in communication with the mobile device 122 may include instructions for routing the vehicle or operating the vehicle. An estimated travel time may be calculated based on traffic values as well as distances determined from the road geometry. Further, possible routes may be chosen by a user and/or an autonomous vehicle based on branches of intersections traveled by previous vehicles. For example, as indicated above, it may be determined that a vehicle traveled a path that includes an off-ramp branch of an intersection. This off-ramp branch may then be determined to be a navigable branch of the road system based off the determined path of the vehicle. Also, data indicating times of the acquisition of the data points may indicate a time when a determined navigable branch or road geometry is navigable. Further, other allowable vehicle maneuvers and road geometries may be determined using the techniques described herein.

The computing system may generate driving commands for steering the vehicle, shifting gears, increasing and decreasing the throttle, and braking based on the traffic levels or exhaust levels. For example, when a navigation system indicates that an off-ramp branch of a highway is a navigable route, the computing system may select this route and control the vehicle to travel this route using geometry determined for the off-ramp branch. In addition, cars may be routed away from route branches determined to not be navigable, or currently navigable.

The computing system may generate auxiliary commands for controlling the headlights, turn signals, windshield wipers, defrost, or other auxiliary functions not directly related to the movement of the vehicle. The autonomous vehicle may include sensors for identifying the surrounding and location of the car. The sensors may include GPS, light detection and ranging (LIDAR), radar, and cameras for computer vision. Proximity sensors may aid in parking the vehicle. The proximity sensors may detect the curb or adjacent vehicles. The autonomous vehicle may optically track and follow lane markings or guide markings on the road.

Figure 4:
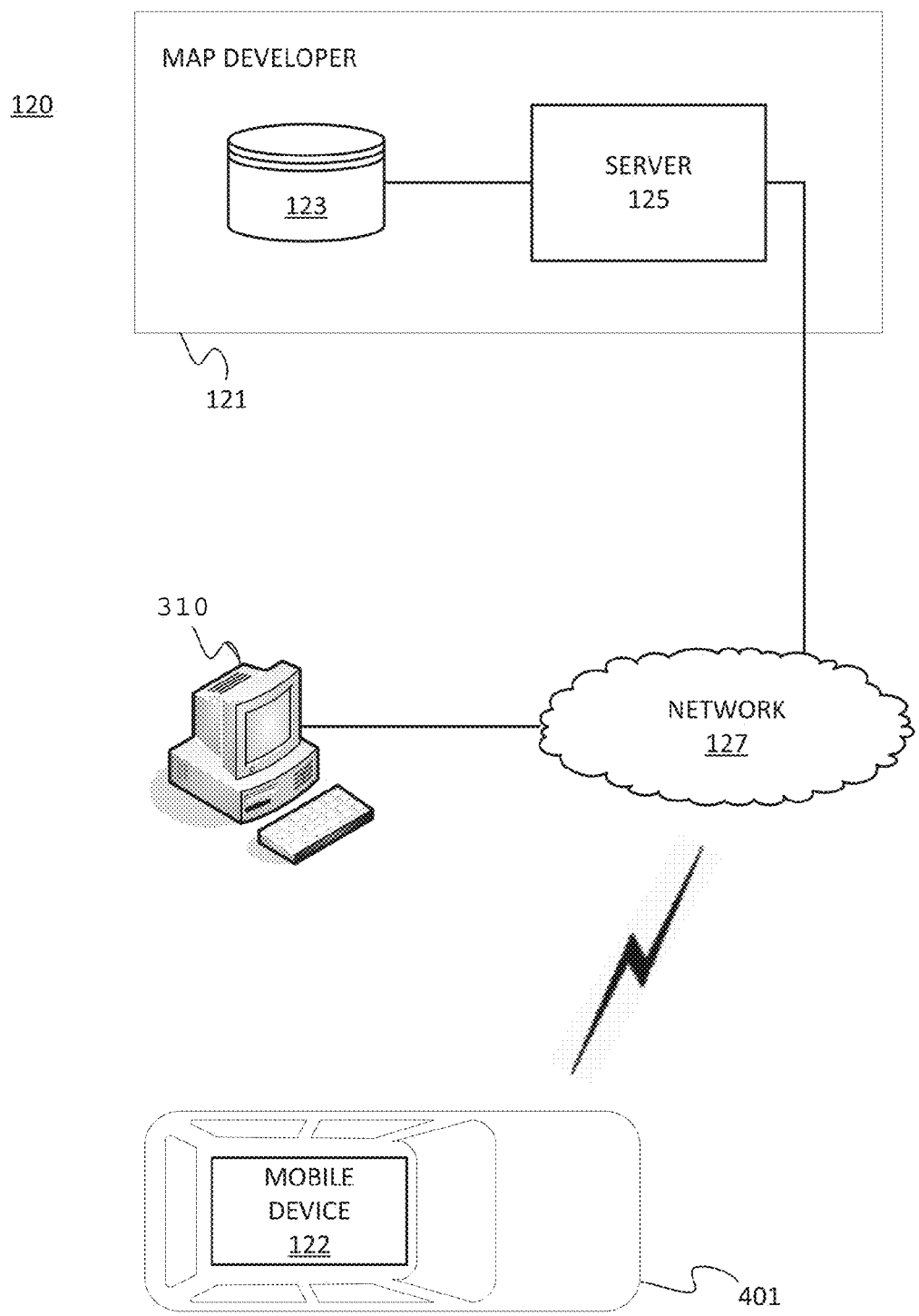
FIG. 4 illustrates an example system for road geometry generation from sparse data.

FIG. 4 illustrates an exemplary system 120 for road geometry generation. The system 120 may include includes a developer system 121, a mobile device 122, and a network 127. The mobile device 122 may be associated, coupled, or otherwise integrated with a vehicle 401. Additional, different, or fewer components may be provided. For example, many mobile devices 122 may connect with the network 127.

The developer system 121 includes a server 125 and a database 123. The developer system 121 may include computer systems and networks of a system operator such as HERE or NOKIA Corporation. The geographic database 123 may be partially or completely stored in the mobile device 122.

The developer system 121 and the mobile device 122 are coupled with the network 127. The phrase "coupled with" is defined to mean directly connected to or indirectly connected through one or more intermediate components. Such intermediate components may include hardware and/or software-based components.

The database 123 includes geographic data used for traffic, navigation, and/or assisted or automated driving related applications. The geographic data may include data representing a road network or system including road segment data and node data. The road segment data represent roads or road branches, and the node data represent the ends or intersections of the roads. The road segment data and the node data indicate the location of the roads and intersections as well as various attributes and geometries of the roads and intersections. Other formats than road segments and nodes may be used for the geographic data. The geographic data may include geometries of roads, road segments, or road branches determined from sparse data as indicated above.

The mobile device 122 may include one or more detectors or sensors as a positioning system built or embedded into or within the interior of the mobile device 122. Alternatively, the mobile device 122 uses communications signals for position determination. The mobile device 122 receives location data from the positioning system. The server 125 may receive sensor data configured to describe a position of a mobile device, or a controller of the mobile device 122 may receive the sensor data from the positioning system of the mobile device 122. The mobile device 122 may also include a system for tracking mobile device movement, such as rotation, velocity, or acceleration. Movement information may also be determined using the positioning system. The mobile device 122 may use the detectors and sensors to provide data indicating a location of a vehicle.

The mobile device 122 may communicate location and movement information via the network 127 to the server 125. The server 125 may use the location and movement information received from the mobile device 122 to associate the mobile device 122 with a geographic region, or a road of a geographic region, described in the geographic database 123. Server 125 may also associate the mobile device 122 with a geographic region, or a road of a geographic region, manually.

The server 125 may receive location and movement information from multiple mobile devices 122 over the network 127. The location and movement information may be in the form of mobile device data or data points. The server 124 may compare the mobile device data with data of a road system stored in the database 123. In this way, the positions of vehicles associated with the mobile devices 122 may be determined relative to a road network or a geographic area. Also, the mobile device data may be assigned to, or associated with, particular road branches as is described above.

The computing resources for road geometry generation may be divided between the server 125 and the mobile device 122. In some embodiments, the server 125 performs a majority of the processing. In other embodiments, the mobile device 122 performs a majority of the processing. In addition, the processing is divided substantially evenly between the server 125 and the mobile device 122. For example, data may be collected by the mobile device 122 and data points may be grouped and/or road geometry may be generated by the server 125.

The network 127 may include wired networks, wireless networks, or combinations thereof. The wireless network may be a cellular telephone network, an 802.11, 802.16, 802.20, or WiMax network. Further, the network 127 may be a public network, such as the Internet, a private network, such as an intranet, or combinations thereof, and may utilize a variety of networking protocols now available or later developed including, but not limited to TCP/IP based networking protocols.

Figure 5:
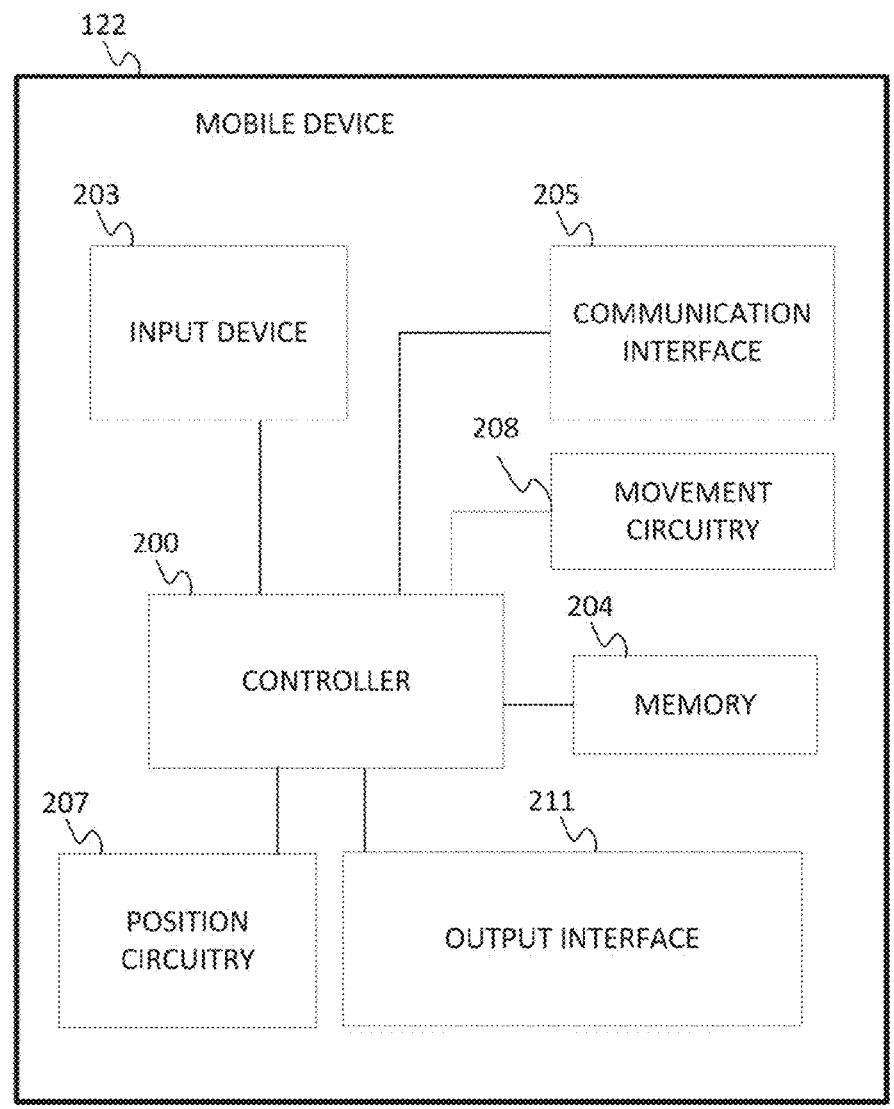
FIG. 5 illustrates an example mobile device of the system of FIG. 4.

FIG. 5 illustrates an exemplary mobile device of the system of FIG. 4. The mobile device 122 includes a controller 200, a memory 204, an input device 203, a communication interface 205, position circuitry 207, movement circuitry 208, and an output interface 211. The output interface 211 may present visual or non-visual information such as audio information. Additional, different, or fewer components are possible for the mobile device 122. The mobile device 122 is a smart phone, a mobile phone, a personal digital assistant (PDA), a tablet computer, a notebook computer, a personal navigation device (PND), a portable navigation device, an assisted driving device, an automated driving or control device, and/or any other known or later developed mobile device. The positioning circuitry 207, which is an example of a positioning system, is configured to determine a geographic position of the mobile device 122. The movement circuitry 208, which is an example a movement tracking system, is configured to determine movement of a mobile device 122 but may operate in place of, or in correlation with, other movement sensors and/or circuitry integrated with a vehicle associated with the mobile device 122. The position circuitry 207 and the movement circuitry 208 may be separate systems, segments of the same positioning or movement circuitry system, or integrated systems of a vehicle associated or otherwise integrated with the mobile device. In an embodiment, components as described herein with respect to the mobile device 122 may be implemented as a vehicle.

In an embodiment, the memory 204 may be operable to store a plurality of data points associated with a vehicle. The plurality of data points may be generated by a mobile device at particular times while traveling a road or path through a geographic area.

The positioning circuitry 207 may include suitable sensing devices that measure the traveling distance, speed, direction, and so on, of the mobile device 122. The positioning system may also include a receiver and correlation chip to obtain a GPS signal. Alternatively or additionally, the one or more detectors or sensors may include an accelerometer and/or a magnetic sensor built or embedded into or within the interior of the mobile device 122. The accelerometer is operable to detect, recognize, or measure the rate of change of translational and/or rotational movement of the mobile device 122. The magnetic sensor, or a compass, is configured to generate data indicative of a heading of the mobile device 122. Data from the accelerometer and the magnetic sensor may indicate orientation of the mobile device 122. The mobile device 122 receives location data from the positioning system. The location data indicates the location of the mobile device 122.

The positioning circuitry 207 may include a Global Positioning System (GPS), Global Navigation Satellite System (GLONASS), or a cellular or similar position sensor for providing location data. The positioning system may utilize GPS-type technology, a dead reckoning-type system, cellular location, or combinations of these or other systems. The positioning circuitry 207 may include suitable sensing devices that measure the traveling distance, speed, direction, and so on, of the mobile device 122. The positioning system may also include a receiver and correlation chip to obtain a GPS signal. The mobile device 122 receives location data from the positioning system. The location data indicates the location of the mobile device 122 or a vehicle associated with the mobile device 122.

The movement circuitry 208 may include gyroscopes, accelerometers, magnetometers, or any other device for tracking or determining movement of a mobile device. The gyroscope is operable to detect, recognize, or measure the current orientation, or changes in orientation, of a mobile device. Gyroscope orientation change detection may operate as a measure of yaw, pitch, or roll of the mobile device. The movement circuitry 208 may be used alone, or with the positioning circuitry 207 to determine mobile device 122 movement.

Positioning and movement data obtained from a mobile device may be considered geographic data, device data, other data, and/or mobile device data, and may be used to determine road geometries.

The input device 203 may be one or more buttons, keypad, keyboard, mouse, stylus pen, trackball, rocker switch, touch pad, voice recognition circuit, or other device or component for inputting data to the mobile device 122. The input device 203 and the output interface 211 may be combined as a touch screen, which may be capacitive or resistive. The output interface 211 may be a liquid crystal display (LCD) panel, light emitting diode (LED) screen, thin film transistor screen, or another type of display. The output interface 211 may also include audio capabilities, or speakers.

The communication interface 205 is configured to send data such as mobile device movement, heading, and position data to a server 125. The position circuitry 207 is configured to determine the current location of the mobile device.

Figure 6:
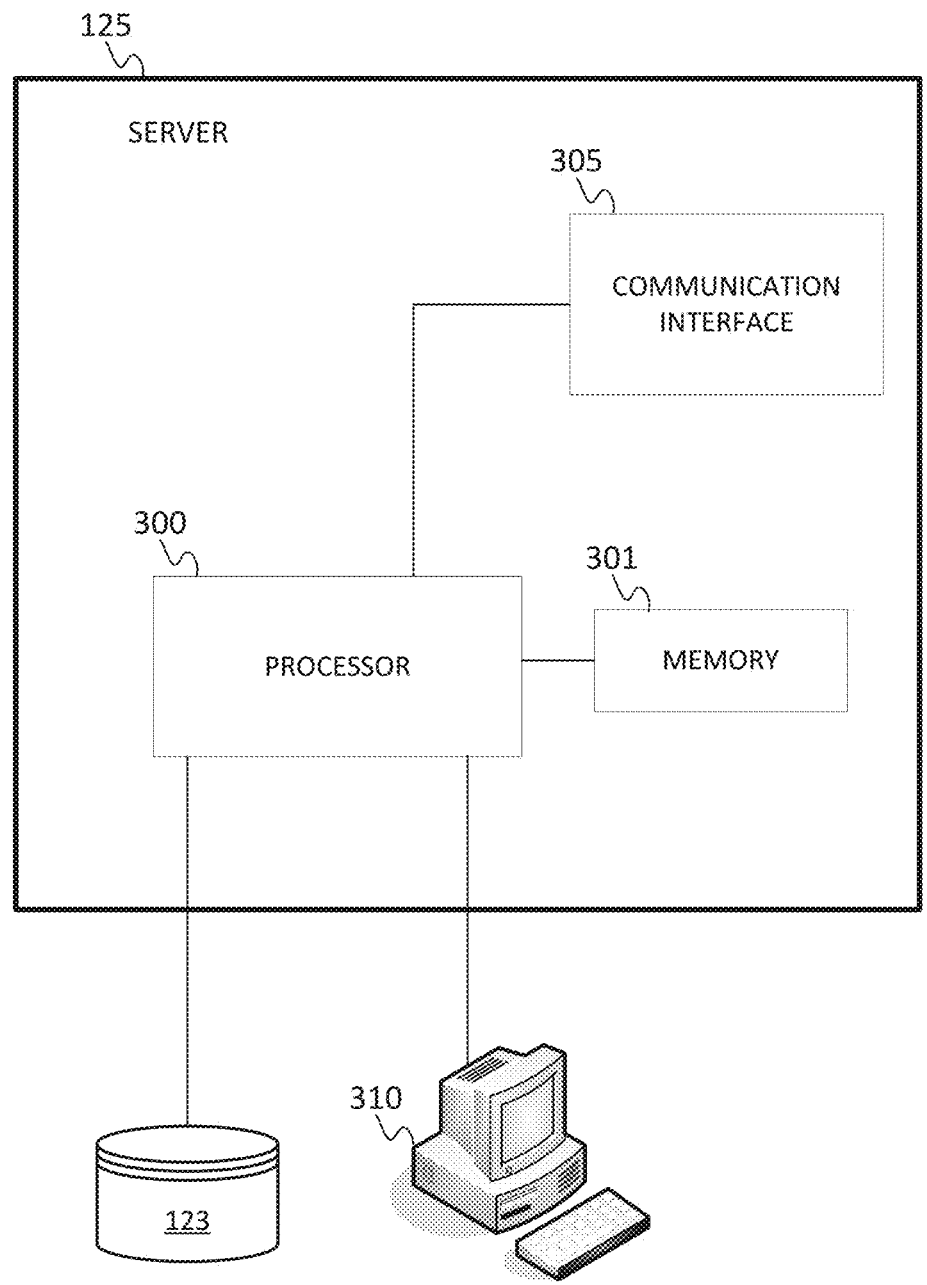
FIG. 6 illustrates an example server of the system of FIG. 4.

FIG. 6 illustrates an exemplary server of the geographic or navigation system of FIG. 4. The server 125 includes a processor 300, a communication interface 305, and a memory 301. The server 125 may be coupled to a database 123 and a workstation 310. The database 123 may be a geographic database. The workstation 310 may be used as an input device for the server 125. In addition, the communication interface 305 is an input device for the server 125. The communication interface 305 may receive data indicative of inputs made via the mobile device 122.

In an embodiment, the memory 301 may be operable to store a plurality of data points associated with mobile devices and/or vehicles. The plurality of data points may be generated by mobile devices at particular times while traveling a road or path through a geographic area. Also, the processor 300 may be configured to cause the server 125 to connect the data points with trajectory lines, determine trajectory angles, and group data points such that road geometries may be determined from the groupings.

The controller 200 and/or processor 300 may include a general processor, digital signal processor, an application specific integrated circuit (ASIC), field programmable gate array (FPGA), analog circuit, digital circuit, combinations thereof, or other now known or later developed processor. The controller 200 and/or processor 300 may be a single device or combinations of devices, such as associated with a network, distributed processing, or cloud computing.

In an embodiment, the controller 200 and/or processor 300 may be configured to connect subsets of a plurality of mobile device data points with trajectory lines, each of the subsets associated with a particular vehicle, and wherein the lines connect adjacent mobile device data points determined by a sequence in which the individual mobile device data points of subsets were acquired, determine at least one trajectory angle for a particular mobile device data point of the plurality of mobile device data points using at least one trajectory line connecting the particular mobile device data point to an adjacent mobile device data point, and assign the particular mobile device data point to a particular road branch of the plurality of road branches.

The memory 204 and/or memory 301 may be a volatile memory or a non-volatile memory. The memory 204 and/or memory 301 may include one or more of a read only memory (ROM), random access memory (RAM), a flash memory, an electronic erasable program read only memory (EEPROM), or other type of memory. The memory 204 and/or memory 301 may be removable from the mobile device 100, such as a secure digital (SD) memory card.

In an embodiment, the memory 204, 301 may be operable to store a plurality of mobile device data points comprising data indicating positions of vehicles having traveled on a roadway of a geographic area, the roadway involving a convergence or divergence of a plurality of road branches for the roadway.

The communication interface 205 and/or communication interface 305 may include any operable connection. An operable connection may be one in which signals, physical communications, and/or logical communications may be sent and/or received. An operable connection may include a physical interface, an electrical interface, and/or a data interface. The communication interface 205 and/or communication interface 305 provides for wireless and/or wired communications in any now known or later developed format.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In an embodiment, a non-transitory computer-readable medium includes instructions operable to cause a computer receive a plurality of mobile device data points comprising data indicating positions of vehicles having traveled on a roadway of a geographic area, the roadway involving a convergence or divergence of a plurality of road branches for the roadway, connect subsets of the plurality of mobile device data points with trajectory lines, each of the subsets associated with a particular vehicle, and wherein the lines connect adjacent mobile device data points determined by a sequence in which the individual mobile device data points of subsets were acquired, determine at least one trajectory angle for a particular mobile device data point of the plurality of mobile device data points using at least one trajectory line connecting the particular mobile device data point to an adjacent mobile device data point, and assign the particular mobile device data point to a particular road branch of the plurality of road branches.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
   receiving, by a processor, a plurality of mobile device data points comprising data indicating positions of vehicles having traveled on a roadway of a geographic area, the roadway involving a convergence or divergence of a plurality of road branches for the roadway;
   connecting, by the processor, subsets of the plurality of mobile device data points with trajectory lines, each of the subsets associated with a particular vehicle, wherein the trajectory lines connect adjacent mobile device data points determined by a sequence in which the individual mobile device data points of subsets were acquired;

determining, by the processor, at least one trajectory angle for a particular mobile device data point of the plurality of mobile device data points using a first trajectory line connecting the particular mobile device data point to an adjacent mobile device data point, and either (i) a heading direction of the particular vehicle or (ii) a second trajectory line connecting the particular mobile device data point with an additional adjacent mobile device data point, wherein the particular mobile device data point is positioned between the adjacent mobile device data point and the additional adjacent mobile device data point; and assigning, by the processor, the particular mobile device data point to a particular road branch of the plurality of road branches based on the determined at least one trajectory angle, wherein the at least one trajectory angle is (i) an angle between the heading direction and the first trajectory line intersecting at the particular mobile device data point or (ii) an angle between the first trajectory line and the second trajectory line intersecting at the particular mobile device data point.

2. The method of claim 1, further comprising:
repeating the determining the at least one trajectory angle and assigning to the particular road branch for remaining data points of the plurality of mobile device data points.

3. The method of claim 1, further comprising:
determining a geometry of the particular road branch based on the mobile device data points assigned to the particular road branch.

4. The method of claim 1, wherein the at least one trajectory angle is determined as the angle between the heading direction and the first trajectory line.

5. The method of claim 4, wherein the adjacent mobile device data point is a subsequent mobile device data point of the subset of the mobile device data points.

6. The method of claim 4, wherein the adjacent mobile device data point is a previous mobile device data point of the subset of the mobile device data points.

7. The method of claim 1, wherein the at least one trajectory angle is determined as the angle between the first trajectory line and the second trajectory line.

8. The method of claim 1, wherein the assigning comprises clustering the plurality of mobile device data points based on the determined at least one trajectory angle.

9. An apparatus comprising:
at least one processor; and
at least one memory including computer program code and operable to store a plurality of mobile device data points comprising data indicating positions of vehicles having traveled on a roadway of a geographic area, the roadway involving a convergence or divergence of a plurality of road branches for the roadway;
the at least one memory and the computer program code configured to, with the at least one processor, cause the apparatus at least to:
connect subsets of the plurality of mobile device data points with trajectory lines, each of the subsets associated with a particular vehicle, and wherein the lines connect adjacent mobile device data points determined by a sequence in which the individual mobile device data points of subsets were acquired;
determine at least one trajectory angle for a particular mobile device data point of the plurality of mobile device data points using a first trajectory line connecting the particular mobile device data point to an adjacent mobile device data point, and either (i) a heading direction of the particular vehicle or (ii) a second trajectory line connecting the particular mobile device data point with an additional adjacent mobile device data point, wherein the particular mobile device data point is positioned between the adjacent mobile device data point and the additional adjacent mobile device data point; and assign the particular mobile device data point to a particular road branch of the plurality of road branches based on the determined at least one trajectory angle, wherein the at least one trajectory angle is (i) an angle between the heading direction and the first trajectory line intersecting at the particular mobile device data point or (ii) an angle between the first trajectory line and the second trajectory line intersecting at the particular mobile device data point.

10. The apparatus of claim 9, wherein the at least one memory and the computer program code further configured to, with the at least one processor, cause the apparatus at least to:
repeat the determination of trajectory angles and assigning to road branches for the rest of the plurality of mobile device data points.

11. The apparatus of claim 9, wherein the at least one memory and the computer program code further configured to, with the at least one processor, cause the apparatus at least to:
determine a geometry of the particular road branch based on the mobile device data points assigned to the particular road branch.

12. The apparatus of claim 9, wherein the at least one trajectory angle is determined as the angle between the heading direction and the first trajectory line.

13. The apparatus of claim 12, wherein the adjacent mobile device data point is a subsequent mobile device data point of the subset of the mobile device data points.

14. The apparatus of claim 12, wherein the adjacent mobile device data point is a previous mobile device data point of the subset of the mobile device data points.

15. The apparatus of claim 9, wherein the at least one trajectory angle is determined as the angle between the first trajectory line and the second trajectory line.

16. The apparatus of claim 9, wherein the assigning comprises determining clusters of the plurality of mobile device data points based on the determined at least one trajectory angle.

17. A non-transitory computer readable medium including instructions that when executed on a computer are operable to:
receive a plurality of mobile device data points comprising data indicating positions of vehicles having traveled on a roadway of a geographic area, the roadway involving a convergence or divergence of a plurality of road branches for the roadway;
connect subsets of the plurality of mobile device data points with trajectory lines, each of the subsets associated with a particular vehicle, and wherein the lines connect adjacent mobile device data points determined by a sequence in which the individual mobile device data points of subsets were acquired;
determine at least one trajectory angle for a particular mobile device data point of the plurality of mobile device data points using a first trajectory line connecting the particular mobile device data point to an adjacent mobile device data point, and either (i) a heading direction of the particular vehicle or (ii) a second trajectory line connecting the particular mobile device data point with an additional adjacent mobile device data point, wherein the particular mobile device data point is positioned between the adjacent mobile device data point and the additional adjacent mobile device data point; and assign the particular mobile device data point to a particular road branch of the plurality of road branches based on at the at least one trajectory angle, wherein the at least one trajectory angle is (i) an angle between the heading direction and the first trajectory line intersecting at the particular mobile device data point or (ii) an angle between the first trajectory line and the second trajectory line intersecting at the particular mobile device data point.

18. The medium of claim 17, wherein the at least one trajectory angle is determined as the angle between the heading direction and the first trajectory line, and wherein the adjacent mobile device data point is a subsequent mobile device data point of the subset of the mobile device data points.

19. The medium of claim 17, wherein the at least one trajectory angle is determined as the angle between the heading direction and the first trajectory line, and wherein the adjacent mobile device data point is a previous mobile device data point of the subset of the mobile device data points.

20. The medium of claim 17, wherein the at least one trajectory angle is determined as the angle between the first trajectory line and the second trajectory line.

* * * * *